United States Patent [19]

Thurston

[11] 3,887,838

[45] June 3, 1975

[54] GENERATION OF STEPPED VOLTAGES FOR COLOR TELEVISION AND THE LIKE

[75] Inventor: Richard P. Thurston, Wayland, Mass.

[73] Assignee: Polaroid Corporation, Cambridge, Mass.

[22] Filed: Mar. 4, 1969

[21] Appl. No.: 805,113

Related U.S. Application Data

[63] Continuation of Ser. No. 573,907, Aug. 22, 1966, abandoned.

[52] U.S. Cl. ............. 315/376; 307/246; 307/252 K; 313/473

[51] Int. Cl. ............. H01j 29/80

[58] Field of Search ............ 315/30, 14; 313/92.5 P, 313/473; 307/246, 252, 252 J, 252 K

[56] References Cited

UNITED STATES PATENTS

| | | | |
|---|---|---|---|
| 3,109,956 | 11/1963 | Stratton | 315/14 |
| 3,372,298 | 3/1968 | Merryman | 315/14 |
| 3,396,233 | 8/1968 | Kagan | 315/30 X |
| 3,424,939 | 1/1969 | Clingman, Jr. | 315/14 |
| 3,439,217 | 4/1969 | Shortes | 315/14 |

*Primary Examiner*—Malcolm F. Hubler
*Attorney, Agent, or Firm*—Gerald L. Smith; Michael Bard; John W. Ericson

[57] ABSTRACT

This specification discloses a high voltage switching system for driving the screen of a color television picture tube in order to generate different color images on the screen thereof in accordance with different video signals. The switching system comprises a transformer, which is connected into a resonant circuit with the capacitance provided by the screen of the color television system. The inductance provided by the transformer is periodically switched between low and high inductance and simultaneously with the switching, energy is coupled into and out of the resonant circuit to generate a step waveform across the capacitance provided by the screen of the picture tube.

2 Claims, 5 Drawing Figures

INVENTORS
Richard P. Thurston
BY
Brown and Mikulka
and
James E. Mrose
ATTORNEYS

INVENTORS
Richard P. Thurston

BY

Brown and Mikulka
and
James E. Mrose
ATTORNEYS

INVENTORS
Richard P. Thurston

BY

Brown and Mikulka
and
James E. Mrose
ATTORNEYS

GENERATION OF STEPPED VOLTAGES FOR COLOR TELEVISION AND THE LIKE

This is a continuation of application Ser. No. 573,907, filed Aug. 22, 1966, now abandoned.

The present invention relates to improvements in the generation of stepped-waveform electrical signals, and, in one particular aspect, to novel and improved sources of electrical impulses, suitable for high-voltage excitation of velocity-modulated color television picture tubes, wherein uncomplicated and reliable solid-state equipment slaved in relation to synchronizing signals uniquely produces cyclic rapid shifts between predetermined levels of voltages.

In conformity with classical theories relating to color and its perception, reproductions of subjects in color have been approached by resolving discrete incremental areas of the broad-area subject in terms of three primary-color components and by attempting to duplicate, as closely as possible, each of these discrete incremental areas with the same primary colors in the same proportions. Conventional three-color television systems provide a typical example of this point-by-point approach; there, each element of a scene is separately viewed by three cameras each responding to a different one of its three (red, green and blue) primary-color contents, and, at a receiving site, electrical signals characterizing the camera detections for each point in the scene are translated into excitations of one or more of three phosphors (respectively emitting red, green and blue light) which serve a corresponding elemental area of the picture tube screen. Such viewing-screen phosphors commonly comprise minute dots arrayed in triangular clusters of three, and electron beams from three guns slaved with different ones of the three cameras are guided through a high-precision apertured shadow mask to impinge upon the different phosphor dots and thereby cause each emission of a different-color light from each of them to be in as direct a relation as possible to the amount of that same color which is present at a corresponding point in the televised scene. The inevitable search for greater economy, lesser criticality, increased brightness, better quality, and small size has led to a number of alternative proposals which, in particular, would obviate the need for these highly complex mask and dot-cluster features. By way of example, multistripe and multiple-layer picture tube screens have been thought to be promising alternatives, with the latter holding the particular attraction that each of the three light-emitting materials needed to produce a different one of the primary colors may be introduced as a separate and substantially continuous broad-area layer near the face of a picture tube. Through proper selection of screen materials and control of electron-accelerating potentials each of the layers may theoretically be excited into emission of a different primary-color light output which should serve to recreate the televised scene in substantially full natural colors. As a practical matter, it is difficult to provide equipment of compact form which will economically and reliably produce the different rapidly switched accelerating potentials which are required to effect color changes at rapid rates in such layered picture tubes. It has also been known heretofore that certain advantages may be realized through exploitation of the phenomenon that colors perceived in the field of an image are evidently dependent upon the interplay of its longer and shorter wavelengths, without narrow limitation to those specific wavelengths of the Newtonian spectrum with which colors are classically identified. Recognitions based upon this phenomenon have permitted televising in multiple colors through translations involving less than the usual three color codes, and, specifically, by way of picture tubes which emit visible light of but two distinctive bands of wavelengths. In one convenient practice, for example, the screen of a picture tube may involve but two phosphors capable of emitting light of essentially reddish and greenish wavelengths, respectively, and which may be scanned by electrons such that they are either excited into emissions separately, or, alternatively, one and both are excited into emissions separately, in response to control signals characterizing the respective lightness-distributions in a televised scene being viewed through two different filters. Currently preferred fabrications involve either the use of two phosphor layers which may be deposited in co-extensive relation to form the screen, or, alternatively, a substantially homogeneous screen comprised of discrete juxtaposed amounts of the two phosphors (example: grains of one phosphor each carrying a coating by the other). Modulation of the kinetic energies of the impinging electrons (via control of accelerating potentials) provides an advantageous approach to modulation of the light emissions from the two phosphors when they either inherently emit or are artificially caused to emit differently under different accelerating-potential conditions. However, in both three- and two-color tubes, the levels and spacing between levels of needed accelerating potentials, and the electrical power involved, militate against color modulations on a high-frequency (typically 3.58 megacycles) dot-sequential basis; radiation problems alone necessitate the use of troublesome and costly shielding, for example. Instead, line- or field-sequential modulations, at significantly reduced rates, are more attractive for that reason, as well as for other reasons, such that they better lend themselves to tape recording, for example. Because field-sequential scanning tends to develop disturbing flicker, line-sequential scanning is preferable.

Color-characterizing signals should be applied to a velocity-modulated picture tube at times which are synchronized with the acceleration-voltage modulations responsible for producing the different color emissions from the picture tube. Preferably, the latter modulations should involve swift changes in the substantially constant potentials required by the accelerating anodes; these potentials are at different high-voltage levels and are separated by relatively high voltage spans which render the changes difficult to execute, particularly in the exceedingly short intervals available. Moreover, there is an inherent lack of symmetry in the switchings required in certain preferred "ternary" systems, such as those which are intended to shift voltages for three different colors, and this poses a very severe problem when it is sought to perform such switchings by automatic electronic equipment. In accordance with the present teachings, however, sustained electrical signals alternately of relatively high and low levels, having desirably short rise and fall times, and suitable for color T.V. voltage changing and/or color gating, may be advantageously produced at remarkably high efficiency by unique electronic circuitry of uncomplicated and inexpensive construction in which interrupted resonance conditions and shock excitations are developed under precise control of synchronizing pulses. Such circuitry lends itself to expression in static solid-state form, involving simple inductive units and semiconductor control elements, and is capable of feeding highly capacitive loads such as those formed by the accelerating anode structures of picture tubes. Importantly, part of the total power involved in switching between the desired different voltage levels is uniquely derived from power expended in switching in one of the two directions.

It is one of the objects of the present invention, therefore, to provide novel and improved apparatus of uncomplicated construction and high efficiency which effectively switches between different sustained potential levels at high switching rates.

Another object is to provide unique and advantageous voltage-changing circuitry in which electrical energy expended in driving output voltages to predetermined levels is conserved and exploited in effecting changes of the output voltages to different predetermined levels.

A further object is to provide an improved source of sustained electrical potentials in which the output potentials exhibited by the combination of an inductive device coupled with a capacitive load are at times rapidly shifted in response to the flows of stored electrical energy.

An additional object is to provide a novel efficient generator of stepped voltages wherein a highly capacitive load such as the accelerating anode structure of a television picture tube is inductively supplied with and relieved of electrical energy in response to rapid gatings of supplied and stored energy in slaved relation to synchronizing impulses.

Still further, it is an object to provide a low-power stepped-wave electric generator of the type including a transformer having a highly capacitive loading, wherein gated current flows on the primary side of the transformer are at certain times drawn from an external power source and at other times from storage of the same power.

By way of a summary account of practice of this invention in one of its aspects, high-voltage pulses of substantially rectangular form are developed across a parallel combination of a substantially fixed capacitance and the inductances which are witnessed in a secondary winding of a transformer, the primary side of the transformer at different times being caused to exhibit effectively open-circuit or short-circuit conditions under control of semiconductor gating or valving devices which are capable of switching the flow of primary currents from a separate source or from storage capacitance. The short-circuit conditions, which are developed when currents are briefly pulsed through the primary side, are attended by a low effective inductance, and, hence, a high resonant frequency LC combination on the secondary side; during these brief intervals, the secondary voltages may be inductively raised or lowered with great rapidity under efficient substantially sinusoidal conditions. The open-circuit conditions, which are developed at other longer times, are attended by a high effective inductance, and, hence, a relatively low resonant frequency combination on the secondary side; during these longer intervals, the secondary voltages tend to remain at substantially the levels to which they have been set by action of the primary currents. In one operating arrangement, brief bursts of current from a low impedance power source are drawn through the primary side of the transformer, thereby rapidly inducing a high voltage on the secondary side, in response to triggering pulses synchronized with the line-scanning in a color television picture tube. Each of these current bursts causes attendant storage of energy, preferably in a storage capacitor associated with the primary side. At other alternate times, similar triggering pulses gate the discharge of current from the storage capacitor through the primary side of the transformer, in a sense to inductively reduce the secondary voltage. At intermediate times, the secondary voltage remains relatively fixed at the levels to which it has been set by action of the primary currents. The secondary voltages, witnessed by the accelerating-anode structure of the picture tube, serve to accelerate the scanning electrons differently in accordance with the needs for reproducing different color emissions during predetermined line scans.

Although the features of this invention which are considered to be novel are expressed in the appended claims, further details as to preferred practices of the invention, as well as the further objects and advantages thereof, may be most readily comprehended through reference to the following description taken in connection with the accompanying drawings, wherein:

Figure 1:
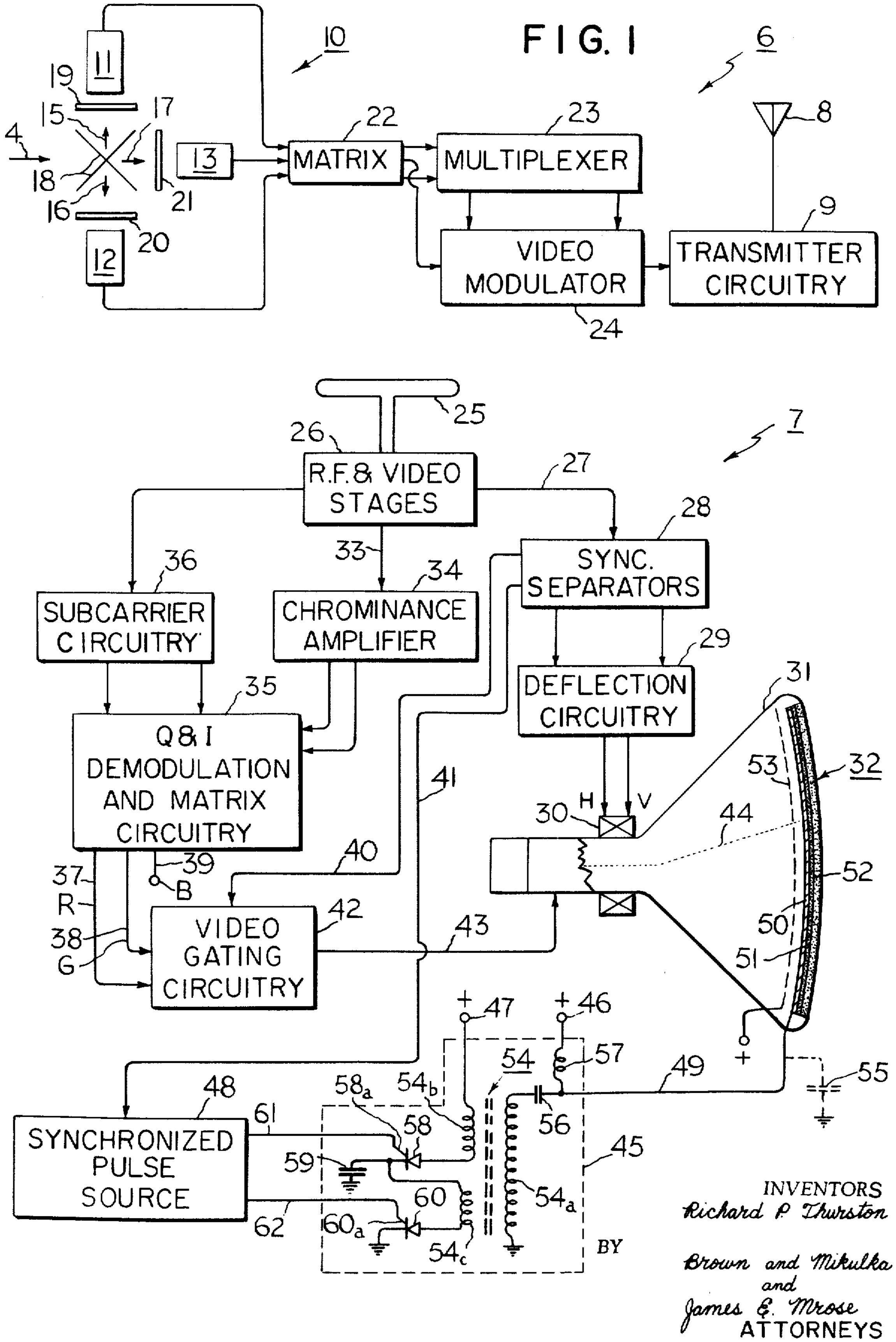
FIG. 1 represents an improved two-color penetration-type line-sequential television system of an arrangement in which the present teachings may be applied to particular advantage, the illustrations being in part in block-diagram and in part in schematic forms.
Figure 2:
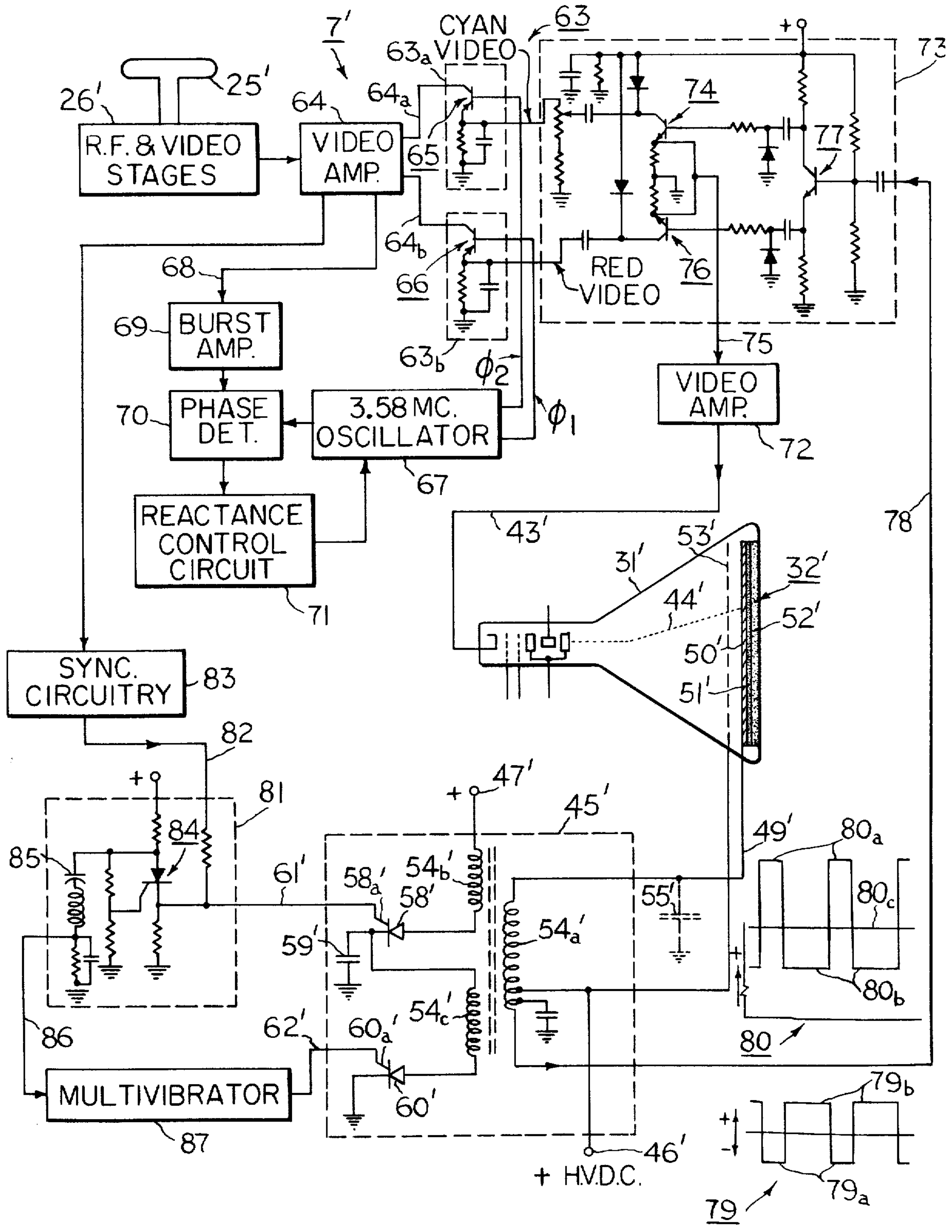
FIG. 2 is a partly schematic and partly block-diagrammed color television receiver diagram incorporating an alternative high-voltage generating unit together with color-gating and synchronizing circuitry.
Figure 3:
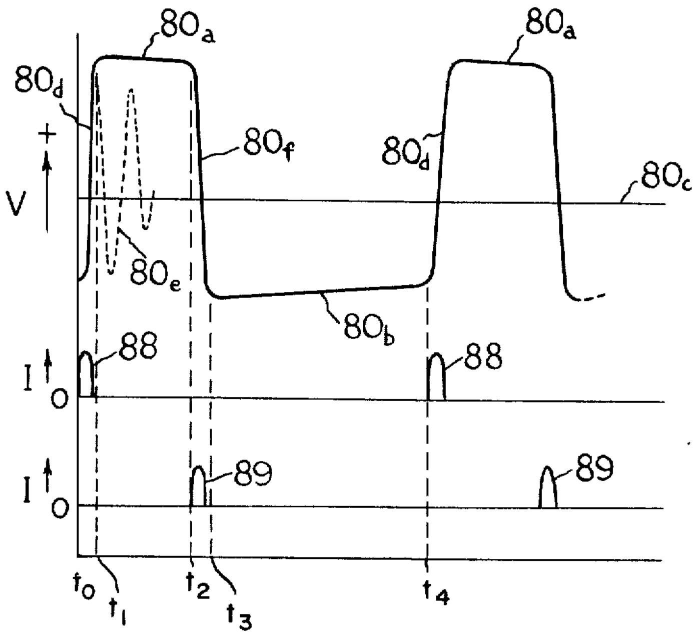
Figure 4:
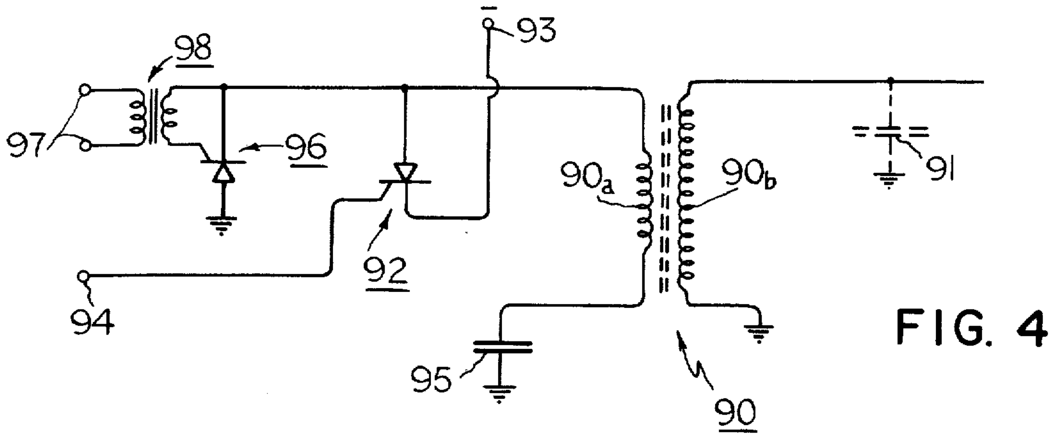
Figure 5:
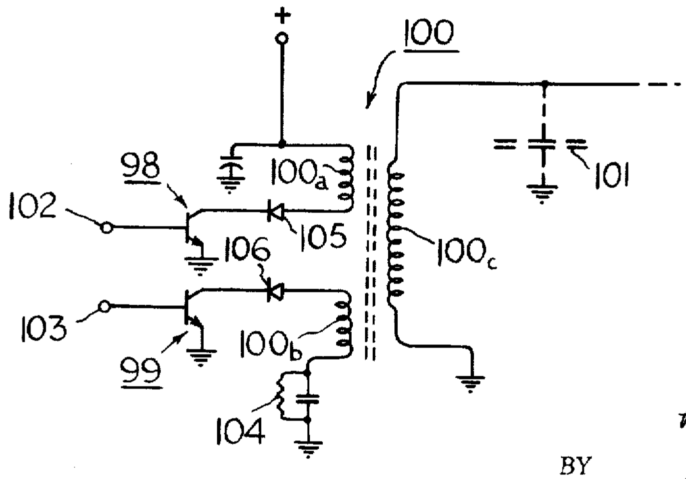

FIG. 3 comprises a set of voltage and current waveforms characterizing conditions associated with improved voltage-changing units such as those in FIGS. 1 and 2;

FIG. 4 provides a schematic illustration of a voltage-changing circuit involving a single exciting winding; and FIG. 5 is a schematic diagram of a transistorized voltage-changing circuit embodying certain of the present teachings.

The system arrangement portrayed in FIG. 1 includes color television transmitting and receiving apparatus, 6 and 7, respectively, which are in generally conventional communication by way of electromagnetic radiations within a prescribed television-frequency channel. Transmitting antenna 8 is excited by transmitter circuitry 9 of known form adapted to deliver an output modulated to contain the customary components (audio, video, deflection, chrominance and color burst) for the color signals which are to be radiated. Luminance and chrominance aspects of televised scenes are characterized via a camera assembly 10 which includes the usual three image orthicon or equivalent pickup tubes, 11–13, electrically excited in the customary fashion. Light 14 emanating from a televised scene is shown to be optically resolved into three image beams 15–17 by a mirror array 18, and different color filters 19–21 selectively pass different color contents of the scene (such as red, green and blue contents) to the pickup tubes. The camera outputs are processed by a conventional matrix 22 to produce the standard brightness and chrominance signals, which are then prepared for transmission by way of a known form of multiplexer 23 and modulator 24.

At the two-color receiver 7, the high-frequency transmissions intercepted by antenna 25 are applied to a conventional embodiment of r.f. and video stages 26, where the received information is resolved into the component signals customarily processed in three-color television receivers. Coupling 27 symbolizes the delivery of synchronizing signals to sync separators 28 serving the usual horizontal and vertical deflection circuitry 29 which supplies the deflection yoke 30 associated with the penetration-type picture tube 31 having a layered faceplate structure 32. In addition, coupling 33 characterizes the application of a chrominance (video modulation) signal to a chrominance amplifier 34 which delivers I and Q signal sideband components in quadrature to the Q and I demodulation and matrix circuitry 35, the latter circuitry also being supplied by the output from subcarrier circuitry 36 which provides the needed subcarrier-frequency signals of phases which promote the desired decoding of the chrominance information into outputs, in couplings 37–39, representative of the red (R), green (G) and blue (B) color contents of the televised scene. The system as thus far described is of well-known form and, in addition to the outputs already referred to, further provides sync outputs, in couplings 40 and 41, which characterize synchronism with the horizontal line scanning.

For purposes of exciting the two-color picture tube 31, only two of the chrominance information outputs are required, and these are chosen as the red-characterizing signals (R) from coupling 37 and the green-characterizing signals (G) from coupling 38. Both of these signals are delivered to gating circuitry 42, where, under synchronous slaving to the signals in coupling 40, they are gated to the output coupling 43 feeding the picture tube control electrode or electrodes for modulating the intensities of the electron beam 44 from a single electron gun. The gating in circuitry 42 preferably is arranged to pass the red (R) signal during the periods of two successive horizontal line scans, and then to pass the green (G) signal during the third successive horizontal line scan, repeatedly, in accordance with practices which do not per se constitute the present invention but which are important to the production of two-color reproductions which will not exhibit disturbing "waterfall" visual effects.

The promotion of two differently-colored visible emissions from the faceplate phosphor screen arrangement 32 depends upon the electron-acceleration voltages extant at various times. Two distinct levels of high voltage are required, and in the illustrated embodiment these are developed by way of a unique stepped-voltage supply 45 which is fed both from a high-voltage d-c source terminal 46, from a second low-voltage d-c source terminal 47, and from the triggering pulse outputs of a pulse source 48 synchronized with the horizontal line scans by the coupling 41. The resulting stepped voltages appearing in coupling 49 are applied to an inner conductive (ex. evaporated aluminum) layer 50 which is of a type and form commonly used in picture tube constructions and serves as an accelerating anode. Phosphor screen layer 51, nearer the electron gun, preferably comprises a conventional phosphor which emits substantially red visible light when struck by electrons from beam 44 having a relatively low kinetic energy (i.e., relatively low velocity), as determined by a relatively low potential applied to anode 50. The outer phosphor screen layer 52, nearest the glass faceplate, efficiently emits light of another predetermined color, such as substantially green or cyan light, when excited by impinging electrons having a relatively high kinetic energy as determined by a relatively high accelerating potential applied to anode 50. Emissions of reddish light from inner layer 51 occurring simultaneously with emissions of greenish or cyanish light from outer layer 52, during intervals when the higher accelerating potentials are applied, result in substantially whitish light outputs. Consequently, the picture tube is effectively a binary color-coded device, producing substantially red and white outputs; however, the viewers' mind-eye relationships enable their perceptions of multi-color images substantially like those of the original scene when the picture tube is properly modulated. Conductive screen or mesh 53, close to the target layers and maintained at a fixed accelerating potential, is illustrated as one expedient for preserving essentially fixed accelerating potentials for the electron beam while it undergoes horizontal and vertical deflections, thereby suppressing misregistrations of the two color images.

Stepped-voltage supply 45 produces the desired accelerating potentials by superimposing upon the high d-c voltage of source terminal 46 certain induced voltages developed through inductive unit 54. This unit includes a secondary winding portion $\mathbf{54}_a$ which is essentially in parallel with the capacitance, to ground, 55, of the accelerating anode structure (this capacitance being represented in dashed linework). Capacitance 56 and choke 57 serve to isolate the unit 54 from the high voltage of the d-c supply. The primary side of the transformer-type inductance unit includes two primary winding portions, $\mathbf{54}_b$ and $\mathbf{54}_c$. Uniquely, only one of these primary windings, $\mathbf{54}_b$, is directly coupled with a low-impedance d-c source terminal, 47, and it is further in series with the switching or gating path of a thyristor device in the form of a silicon controlled rectifier 58 and with a storage capacitance 59. The other primary winding, $\mathbf{54}_c$, is connected across this same storage capacitance by way of another silicon controlled rectifier 60. When gate lead $\mathbf{58}_a$ of SCR 58 is properly excited by a pulse from the output coupling 61 of synchronized source 48, the resultant gating of current from source 47 through primary winding $\mathbf{54}_b$ causes a relatively high voltage to be induced across the secondary $\mathbf{54}_a$. This induced voltage appears quickly, during approximately one-half cycle of the relatively high natural resonant frequency which is effective on the secondary side while the primary current causes the primary to exhibit the effects of a short circuit. When the primary current ceases, the primary side exhibits the effects of open-circuit conditions and the secondary inductance then becomes relatively high, such that the parallel combination of winding $\mathbf{54}_a$ and accelerating-anode capacitance 55 has a relatively low natural resonant frequency. Accordingly, the relatively high voltage which had been developed at the accelerating anode tends to remain high and to decay relatively slowly.

Each brief pulse of current drawn from source terminal 47 through SCR 58 simultaneously develops a charge across the storage capacitance 59, and that charge remains available to force current through primary winding $\mathbf{54}_c$ when its associated SCR 60 has its gate lead $\mathbf{60}_a$ properly excited by a subsequent pulse from the output coupling 62 of synchronized pulse source 48. The resulting brief pulse of current in primary winding $54_c$ is of such sense, and the winding itself is of such direction, that the secondary voltage is quickly reduced to a desired low value, where it tends to remain until another current pulse is drawn through SCR 58.

Television receiver apparatus 7' in FIG. 2 is similar in many respects to that illustrated in FIG. 1, and functional counterparts are thus identified by the same reference characters with distinguishing single-prime accents added, for the purpose of simplifying these disclosures. The demodulation of color-characterizing signals is shown to be performed by a so-called "single-axis" demodulator 63 including two demodulator sections, $63_a$ and $63_b$, which are supplied with the composite video signals over couplings $64_a$ and $64_b$, respectively, from a video amplifier 64. The composite video signals are resolved into cyan-characterizing and red-characterizing electrical output signals by passing through separate gating channels those portions of the 3.58 mc. composite video which are of phases characterizing the cyan and red color content, respectively. As is shown, each of the demodulator sections $63_a$ and $63_b$ includes a different transistor, 65 and 66, respectively, having its base excited by a different one of the oppositely phased 3.58 (approx.) mc. outputs $\phi_2$ and $\phi_1$, respectively, from the 3.58 mc. oscillator 67. These $\phi_1$ and $\phi_2$ output signals are substantially 180° out of phase in relation to one another and, further, are synchronized in relation to the usual color burst signals such that they periodically render the transistors 65 and 66 conductive of the applied color-characterizing video signals only at such times as the latter 3.58 mc. signals characterize the cyan and red conditions, respectively. This takes advantage of known attributes of the 3.58 mc. color-characterizing video signals in couplings $64_a$ and $64_b$. For purposes of synchronizing the oscillator 67 with the color burst signals appearing in input coupling 68, the phases of signals from the oscillator and from the burst amplifier 69 are compared by phase detector 70, the outputs of the latter being used to regulate a reactance control circuit 71 which slaves the oscillator 67. Such oscillator-synchronizing networks are of course well known in current television systems, where they are used to provide signals for the Q and I demodulator stages. Cyan- and red-characterizing output signals from demodulator sections $63_a$ and $63_b$ are next gated to a conventional type of video amplifier 72, and thence are passed on to the cathode of picture tube 31' over coupling 43' at proper times synchronized with the desired white and red line-scanning times. The synchronized gating of these output signals is performed in the gating network 73 which includes a transistor 74 which is biased at appropriate times to pass the cyan video signal to output coupling 75, and a transistor 76 which is at other appropriate times biased to pass the red video signal to the same output coupling. The needed biasings of gating transistors 74 and 76 are under control of a further transistor, 77, which responds to an input of pulses applied to coupling 78 from the voltage-stepping unit 45'. Waveform 79 illustrates the nature of these synchronized gating pulses, the shorter negative pulses $79_a$ being effective to gate only cyan video signals to the picture tube control electrode structure, and the longer (substantially twice as long) positive pulses $79_b$ being effective to gate only the red video signals to the picture tube. These gating pulses are conveniently produced in the same circuitry, 45', which produces the high-voltage stepped potentials, shown in waveform 80, needed to change the accelerating-anode voltages and thereby accomplish the required changes in color in accordance with the aforementioned interlace coding (of two red lines followed by a white line). Relatively high potential levels $80_a$ are sustained during the intervals when the line scans are to be traced in terms of whitish light, and relatively low (but still high) potential levels $80_b$ are sustained during the intervals when two successive line scans are to be traced in terms of reddish light. Levels $80_a$ and $80_b$ are respectively positive and negative in relation to a d-c voltage $80_c$, which is substantially that applied to the high-voltage d-c source terminal 46'.

Stepping-voltage source 45' differs from source 45 principally in that part of the secondary winding portion $54_a'$ is tapped by coupling 78 to derive the gating waveform 79 similar to but of phase opposite to that of the high-voltage waveform 80. The lack of symmetry in these waveforms, resulting from the durations of one stepped portion being twice that of the other, necessitates the triggering of SCR's 58' and 60' at times which are of similar unequal spacings. For this purpose, suitable triggering pulses may be derived from a divide-by-three circuit 81 which responds to an input of horizontal sync pulses in coupling 82 and delivered by the usual form of sync circuitry 83 in synchronism with the times that horizontal line scans are to occur. Circuit 81 is a relaxation oscillator involving a thyristor 84 and a capacitor 85 which is charged and discharged under control of the thyristor. Horizontal synchronizing pulses applied to the cathode of device 84 via coupling 82 cause breakdown of the device, and attendant sudden discharges of the capacitor, for every third periodic pulse in a horizontal sync pulse train. Ordinarily, the times of capacitor discharges would tend to be somewhat erratic, without the slaving to the horizontal sync pulses; however, the latter negative pulses, which effectively add to the capacitor charge voltage, are of sufficient value to insure that breakdown will occur exactly when intended (i.e., when every third sync pulse is witnessed), but not otherwise. Each such discharge thus produces a gating pulse in coupling 61', synchronously with the occurrence of every third horizontal sync pulse, just as is required. Corresponding gating pulses are provided in coupling 62' a predetermined time (i.e., the interval following one line scan) after each gating pulse occurs in coupling 61', and this is conveniently achieved by tapping off pulses corresponding to the latter pulses, via coupling 86, and utilizing these to trigger a single-shot multivibrator 87, or the like.

When brief gating pulses 88 (FIG. 3) are applied to the gating lead of thyristor 58' over coupling 61' at times $t_0$ and $t_4$, spaced by substantially the spacing between every third successive horizontal sync pulse, the primary winding portion $54_b'$ draws current via source terminal 47' and simultaneously charges capacitor 59'. During these brief times when the primary current flows in winding $54_b'$, the secondary $54_a'$ exhibits a low inductance, and its natural resonant frequency with capacitance 55' is thus relatively high. Accordingly, the induced secondary voltage $80_d$ rises quickly (example: by about 4 kv.) to the high level $80_a$ in a substantially sinusoidal manner. Were that natural frequency maintained, the shock-excited secondary voltage cycling would be expected to be like that of dashed-line high-frequency waveform $80_e$; however, reversal of direction of voltage, and absence of any gating pulse, insure that the primary winding $54_b'$ will cease to conduct current, and thus the secondary winding then exhibits a relatively high inductance and a relatively low natural frequency between such times as $t_1 - t_2$. Voltage $80_a$ thus remains at a high level, with only some minor variation. At times such as $t_2$, a subsequent gating pulse 89 in coupling 62' causes thyristor 60' to become conductive of current derived at least in part from the prior storage in capacitor 59'. This current flow, through winding section $54_c'$, once again restores a low effective inductance on the secondary side, and energy is very swiftly removed with consequent reduction in the secondary voltage as shown by the substantially sinusoidal drop $80_f$ to the relatively low potential level $80_b$. Subsequently, the level $80_b$ remains substantially uniform for the duration of substantially two line scans, until another gating pulse 88 occurs at time $t_4$. As is illustrated, the gating pulses 88 and 89 need not persist throughout the full cross-over periods ($t_0 - t_1$ and $t_2 - t_3$), inasmuch as the SCR's will remain conductive until the back-induced voltages reverse. Importantly, the described use of storage capacitance which is both charged and discharged through the primary side of the voltage-stepping network makes it impossible for a d-c component of current to appear in the transformer primary. Such a d-c component acts to promote serious distortion (such as "tilt") of the output signals away from desired substantially square or rectangular waveforms. Storage capacitor 59' is selected to have a much higher capacitance than that of the phosphor-screen capacitance 55', such that most of the electrical energy from the primary source will be delivered to the phosphor screen capacitance. By way of example, the phosphor screen capacitance, to ground, may be $10^{-6}$ times that of the storage capacitor, and one-fiftieth as much peak current may be caused to flow in the phosphor screen capacitance as in the storage capacitance.

FIG. 4 depicts another embodiment of voltage-stepping unit in which the primary side of the inductance unit 90 advantageously includes but a single winding, $90_a$. As in the units previously-described herein, the secondary, $90_b$, is in a parallel tuned-circuit relationship with a capacitance, 91, which may be a separate capacitor or the capacitance of a picture tube screen structure or the like, and the resonant-frequency conditions on the secondary side vary with the effective short-circuiting and open-circuiting on the primary side. Thyristor 92 in the form of an SCR gates current through primary winding $90_a$ from a d-c source terminal 93 in response to gating pulses applied to terminal 94 associated with its gate lead, and, at such times, the storage capacitor 95 in series with the primary winding becomes charged so that it may serve as a source during alternate periods when the oppositely-polarized thyristor (SCR) 96 is gated into conduction. The latter SCR, having its cathode at an a-c point in the circuit, is shown connected to be triggered by pulses applied to the primary terminals 97 of a pulse transformer 98 which has its secondary connected across the cathode and gating leads. Circuit operation is like that of the units described hereinbefore, except that, depending upon the intended application, the output may or may not be superimposed upon a d-c level, and the gating pulses may be supplied from any suitable source or sources appropriate to the intended application of the unit.

FIG. 5 illustrates how like effects may be realized using transistors 98 and 99 as the gating devices for the current flows in windings $100_a$ and $100_b$ on the primary side of an inductance unit 100. Secondary $100_c$ is there in parallel with capacitance 101, producing the desired different resonant-circuit conditions when the effective inductance of unit 100 varies as dictated by the primary current and impedance conditions. A brief gating pulse applied to the base of transistor 98 via terminal 102 occasions flow of current through primary winding $100_a$, and thereby rapidly induces a high secondary voltage, which is thereafter sustained for a relatively long period following cessation of the gating pulse. When the transistor 99 associated with the other primary winding section $100_b$ is then gated to a current-conducting condition by a similar pulse applied to base terminal 103, the stored energy on the secondary side of unit 100 is inductively coupled back through primary winding section $100_b$ and is dissipated in the load impedance 104 associated with that winding section. Accordingly, the secondary voltage drops to a desired level, from whence it is raised again when energy is supplied via gated winding section $100_a$ upon occurrence of the next gating pulse at terminal 102, and so on. Diodes 105 and 106 insure that the transistors will not witness unwanted voltages at various times when inductive effects might otherwise develop them. This arrangement obviates the need for a sizeable storage capacitance on the primary side, while at the same time avoiding the use of more than one d-c source on the primary side. Both primary storage capacitance effects and the effects of inductive release of stored energy on the secondary side may be used to advantage in changing the secondary voltage.

There are numerous departures which may be made from the specific practices and contructions which have been thus far described, within the purview of the same teachings. By way of example, autotransformer units may replace the more conventional type of transformer devices of the illustrated embodiments, and the valving or gating may be performed by tubes or semiconductor devices other than the SCR's and transistors which have been shown. It will be evident also that the stepped waveforms, whether superimposed on other signals or not, may be symmetrical rather than non-symmetrical, provided that the gating impulses are evenly spaced. The circuitry may of course be readily adapted to respond to triggering impulses of different polarities from various sources. For some applications, the high-voltage swings may be essentially in one direction, up or down, from a predetermined level, or may have different excursions in the different directions. The use of red- and green-emitting phosphors in a television receiver system is not a limiting one, and others, such as orange- and cyan-emitting phosphors may be used instead. Accordingly, it should be understood that the embodiments and practices described and portrayed have been presented by way of disclosure, rather than limitation, and that various modifications, substitutions and combinations may be effected without departure from the spirit and scope of this invention in its broader aspects.

I claim:

1. Apparatus for producing stepped voltages comprising transformer means having secondary winding means connected in resonant-circuit combination with capacitance, said transformer means including inductance-changing means having primary winding means inductively coupled with said secondary winding means and capable of being switched between different states in which it causes said secondary winding means to exhibit different values of inductance, and control means, including electronic valving means and further electronic valving means, for switching said inductance-changing means between said different states, said control means including means for supplying electrical energy to the resonant-circuit combination through said valving means intermittently and synchronously with certain of the switchings between said different states and capacitor means for storing at least part of said energy externally of said resonant-circuit, and means for discharging the storage of said energy through said further valving means and said transformer means intermittently and synchronously with other of the switchings between said different states; said primary winding means including a first primary winding connected with said energy supplying means through said control means and a second primary winding connected in a discharging relation to said capacitor means through said control means.

2. A color display system comprising:

a screen including phosphors which emit light of different colors when struck by electrons of different energies said screen forming a capacitive electrical load;

an electron gun for emitting a beam of electrons toward said screen;

field generating means for deflecting said beam of electrons in a scanning raster;

means for applying a DC bias voltage to said screen to accelerate electrons emitted from said gun toward said screen;

a transformer having a primary winding and a secondary winding, said secondary winding being adapted to be connected to said screen for applying a time-varying voltage thereto;

a first switching circuit for connecting said primary winding across a voltage source, said first switching circuit including a first electronic switching means and a capacitor in series with each other and with said primary winding, said first switching means having a gate terminal;

a second switching circuit including a second electronic switching means which is connected across said primary winding and said capacitor from a first junction between said first switching means and said primary winding to a second junction on the side of said capacitor and primary winding opposite said first switching means, said second electronic switching means having a gate terminal; and means for applying signals to the gate terminals of said first and second switching means for triggering said first and second switching means into conduction alternately, said transformer having leakage reactance which, upon triggering of either of said first and second switching means, causes said capacitive load to be charged to a respective voltage which then reverse-biases the triggered switching means, whereby said screen is switched repetitively between at least two different voltage levels each of which persists until the next switching means is triggered and whereby said electrons are accelerated to at least two different energies for energizing said screen to produce multiple-color images.

* * * * *